United States Patent
Girmscheid et al.

(10) Patent No.: US 9,531,045 B2
(45) Date of Patent: Dec. 27, 2016

(54) BATTERY COOLER

(75) Inventors: Felix Girmscheid, Cologne (DE); Jens Talmon, Cologne (DE)

(73) Assignee: HANON SYSTEMS, Daejeon-Si (KR)

( * ) Notice: Subject to any disclaimer, the term of this patent is extended or adjusted under 35 U.S.C. 154(b) by 350 days.

(21) Appl. No.: 13/548,748

(22) Filed: Jul. 13, 2012

(65) Prior Publication Data
US 2013/0014923 A1 Jan. 17, 2013

(30) Foreign Application Priority Data

Jul. 14, 2011 (DE) .................. 10 2011 051 839
Jun. 26, 2012 (DE) .................. 20 2012 102 349 U

(51) Int. Cl.
| | | |
|---|---|---|
| F28F 3/00 | (2006.01) | |
| F28D 1/02 | (2006.01) | |
| F28D 7/02 | (2006.01) | |
| F28F 3/12 | (2006.01) | |
| F28D 15/00 | (2006.01) | |
| H01M 10/50 | (2006.01) | |
| H01M 10/613 | (2014.01) | |
| H01M 10/625 | (2014.01) | |
| H01M 10/6556 | (2014.01) | |

(52) U.S. Cl.
CPC ............. *H01M 10/613* (2015.04); *F28F 3/12* (2013.01); *H01M 10/625* (2015.04); *H01M 10/6556* (2015.04); *F28F 2275/025* (2013.01)

(58) Field of Classification Search
CPC .................................................. H01M 10/50
USPC .... 165/104.19, 166, 167, 153, 168; 429/120
See application file for complete search history.

(56) References Cited

U.S. PATENT DOCUMENTS

| | | | | |
|---|---|---|---|---|
| 2,058,057 A | * | 10/1936 | Brunst .................... | 165/148 |
| 2,161,293 A | * | 6/1939 | Heath ................. | F25B 39/024 |
| | | | | 165/170 |
| 2,610,834 A | * | 9/1952 | Dalzell .................... | 165/78 |
| 2,621,028 A | * | 12/1952 | Newhall .................. | 165/78 |
| 2,942,856 A | * | 6/1960 | Woodward et al. ........... | 165/47 |
| 3,334,399 A | * | 8/1967 | Teeguarden ............. | 29/890.039 |
| 4,398,591 A | * | 8/1983 | Bond .......................... | 165/78 |
| 4,800,954 A | * | 1/1989 | Noguchi et al. ............... | 165/153 |
| 4,813,478 A | * | 3/1989 | Jonsson et al. ................. | 165/78 |
| 5,111,878 A | * | 5/1992 | Kadle ......................... | 165/176 |
| 5,287,919 A | * | 2/1994 | George, II ................ | F28F 3/12 |
| | | | | 165/170 |
| 5,836,383 A | * | 11/1998 | Zwittig ........................ | 165/167 |

(Continued)

FOREIGN PATENT DOCUMENTS

| | | |
|---|---|---|
| DE | 10130369 A1 | 1/2003 |
| DE | 69925067 T2 | 11/2005 |

(Continued)

*Primary Examiner* — M. Alexandra Elve
*Assistant Examiner* — Paul Alvare
(74) *Attorney, Agent, or Firm* — Fraser Clemens Martin & Miller LLC; James D. Miller

(57) ABSTRACT

A battery cooler includes at least one support plate and at least one structure plate coupled to the at least one support plate. The at least one structure plate includes a flow channel for receiving a fluid therein. A cross-section of the flow channel has a width greater than a height thereof. The flow channel includes a plurality of webs, wherein one of the webs is disposed adjacent another one of the webs in respect of a direction of flow of the fluid, and the webs decrease the cross-section of the flow channel.

15 Claims, 4 Drawing Sheets

(56) References Cited

U.S. PATENT DOCUMENTS

| | | | |
|---|---|---|---|
| 5,881,805 A * | 3/1999 | Inoue et al. | 165/153 |
| 5,985,483 A | 11/1999 | Verhoog et al. | |
| 6,296,968 B1 * | 10/2001 | Verhoog | B60L 11/1874 29/623.1 |
| 6,666,263 B2 * | 12/2003 | Luz et al. | 165/153 |
| 6,863,120 B2 * | 3/2005 | Hwang et al. | 165/153 |
| 2002/0079093 A1 * | 6/2002 | Rong | 165/153 |
| 2003/0192685 A1 * | 10/2003 | Maeda et al. | 165/166 |
| 2006/0249281 A1 * | 11/2006 | Park et al. | 165/153 |
| 2007/0044946 A1 * | 3/2007 | Mehendale | F28D 1/0341 165/153 |
| 2007/0175617 A1 * | 8/2007 | Brost et al. | 165/149 |
| 2008/0041556 A1 * | 2/2008 | Braun et al. | 165/41 |
| 2011/0052960 A1 | 3/2011 | Kwon et al. | |
| 2011/0162820 A1 * | 7/2011 | Weber et al. | 165/104.19 |

FOREIGN PATENT DOCUMENTS

| | | |
|---|---|---|
| DE | 102008034869 A1 | 6/2009 |
| DE | 102008059955 A1 | 6/2010 |
| EP | 0265528 A1 | 5/1988 |
| EP | 1091426 A2 | 4/2001 |
| EP | 1091438 A2 | 4/2001 |
| EP | 2149771 A1 | 2/2010 |
| JP | 2001090518 A | 4/2001 |

\* cited by examiner

BATTERY COOLER

CROSS-REFERENCE TO RELATED APPLICATION

This application claims the benefit of German Provisional Patent Application No. DE 10 2011 051 839.8 filed Jul. 14, 2011, and German Utility Patent Application No. DE 20 2012 102 349.0 filed Jun. 26, 2012, the entire disclosures of which are hereby incorporated herein by reference.

FIELD OF THE INVENTION

This invention pertains to a battery cooler with means for cooling and heating batteries using a heat transferring fluid. The battery cooler is provided with an arrangement including at least one structure plate and one support plate for the battery cells.

BACKGROUND OF THE INVENTION

Presently known battery coolers serve to temper battery cells of a vehicle battery, preferably for electro or hybrid vehicles. Both a cooling function and a heating function can be required by the battery cells. The battery cooler can be operated with a heat transfer fluid such as a phase changing refrigerant or a liquid heat carrying medium, for example. Heat flows are transferred by heat conduction between a heat exchanger and the battery cells, and vice versa, respectively.

In prior art, the battery cells are tempered using heavy, massive battery coolers that also provide structural, or supporting functions. Often times, the heat transfer fluid, as to its function, is established as a cooling medium or refrigerant, being transported in one or several flow channels through the battery cooler.

DE 10 2008 034 869 discloses a battery. The battery is provided with several battery cells forming a cell compound system and a cooling body connected to the battery cells over heat conducting elements. The cooling body has line-like flow channels arranged over a plane of the cooling body in a meanding pattern. There is no mention of a manufacture of the cooling body.

DE 10 2008 059 955 relates to a process for a manufacture of a cooling body with an integrated flow channel for a battery. A line-like meander-shaped flow channel is produced using a chipless forming technology.

EP 2 149 771 discloses a device for cooling a heat source using a cooling body provided with several pairs of forward and backward flow channels arranged side by side in a cooling body. The cooling body includes several layers of metallic plates. The metallic plates have different cut-outs punched out or are laser cut to form line-like flow channels.

Typically the battery coolers, in addition to the cooling function, have a function to hold very heavy batteries. Therefore, the battery coolers are also designed to be large to provide support to the batteries. Such large battery coolers require excessive installation space and disproportionately contribute to a total weight of the batteries. Moreover, a danger with such large battery coolers is that the refrigerant or the coolant, respectively, does not homogeneously temper the individual cells of the batteries, which may result in less than optimum operation of the batteries.

It is the objective of this invention to provide a battery cooler which minimizes installation space, while being easy to manufacture, economical in material consumption, and structurally robust.

SUMMARY OF THE INVENTION

In concordance and agreement with the present invention, a battery cooler which minimizes installation space, while being easy to manufacture, economical in material consumption, and structurally robust, has been surprisingly invented.

In one embodiment, a battery cooler, comprises: at least one support plate; and at least one structure plate coupled to the at least one support plate, the at least one structure plate including a flow channel for receiving a fluid therein, wherein a cross-section of the flow channel has a width greater than a height thereof, the flow channel including a plurality of webs, wherein one of the webs is disposed adjacent another one of the webs in respect of a direction of flow of the fluid, and the webs decrease the cross-section of the flow channel.

In another embodiment, a battery cooler, comprises: at least one support plate; and at least one structure plate coupled to the at least one support plate, the at least one structure plate including a flow channel for receiving a fluid therein, wherein the flow channel has a multi-flow configuration and includes a plurality of webs, wherein one of the webs is disposed adjacent another one of the webs in respect of a direction of flow of the fluid, and the webs decrease the cross-section of the flow channel.

In yet another embodiment, an assembly of a battery cooler, comprises: at least one mounting frame provided with at least one terminating plate; and a plurality of structure plates configured to be urged against each other by the at least one terminating plate, each of the structure plates including a flow channel for receiving a fluid therein, wherein the flow channel has a multi-flow configuration and includes a plurality of webs, wherein one of the webs is disposed adjacent another one of the webs in respect of a direction of flow of the fluid, and the webs decrease the cross-section of the flow channel.

The invention relates to a battery cooler with means for cooling and heating batteries using a heat transfer fluid, wherein the arrangement is provided with at least one structure plate and one support plate that limit a flow channel upwards and down. The invention is based on a double- or multi-flow flow channel formed in the structure plate through lateral channel boundaries, with the flow channel established flat as a specific feature of the invention, which means that a cross-section of the flow channel is established more than double a width than a height.

The invention is advantageous in that the structure plate includes several island-like webs are formed after each other in direction of flow, pillar-like fixing a distance between the structure plate and the support plate. The webs are passed around by the fluid in such way that the webs reduce a flow cross-section in sections so that the fluid is eddied over the total flow cross-section. Thus, avoiding unhomogeneous cooling. At the end, the elongated webs are deviating structures that can be used to specifically control the flow of the fluid in the battery cooler.

An advantageous embodiment of the invention is that the webs in the flow channel on the structure plate are arranged side by side at right angles to the direction of flow and disposed in groups. Preferably, each group of the webs is offset in relation to the adjacent group in respect of the direction of flow of the fluid by half a lateral distance of the webs normal to the direction of flow.

According to an embodiment of the invention, the support plate is located opposite to the structure plate, which may be formed either as a structure plate or as a flat plate.

Further, when the support plate is formed as the structure plate, the webs on both the structure plates are disposed such that the webs are preferably connected to the corresponding webs on the structure plate being opposite.

The structure plate can be manufactured through a deep drawing, stamping or hydroforming process. For a preferred brazing connection, the flat plate, the structure plate or both plates are provided with a braze material coating. It has shown useful and advantageous to connect the two plates by a brazing process, which enables obtaining a very good surface and flatness of the battery cooler.

The invention is advantageously further developed in that a pipe connection is provided on the support plate. Depending on the design, the pipe connection can be placed on the flat plate or on one of the structure plates.

In a preferred embodiment, geometry of the flow channel on the structure plate of the battery cooler is mirror-symmetric in relation to the longitudinal axis of the battery cooler so that when on operation internal pressure is applied warping is avoided. Also, in brazing or adhesive bonding processes, both plates expand identically as to a thermal behaviour so that a higher degree of flatness of the battery cooler is obtained.

It has been useful and advantageous that the webs of the structure plate, seen in top view, are established to have a circular or elliptic cross-section.

Advantageously, the invention is further developed in that during assembly the structure plates are held and pressed together by two mounting frames and two terminating plates accompanying the frame, wherein the structure plates are held in position by two pins in a fixed point and an elongated hole of the mounting frame, with the fixed point and the elongated hole in the symmetry axis of the structure plate.

Another feature of the invention is that the flow channel is routed multi-flow in order to balance the overheating of the refrigerant problematic for refrigerant cooling.

The number of flows is defined as the number of the straight sections of the flow channel that run substantially parallel to the longitudinal axis of the structure plate. In a two-flow embodiment, therefore, a single counterflow is produced. Correspondingly, in multiple-flow embodiments an (N−1)-fold counterflow is designable. Preferably, however, even-numbered flows with corresponding odd-numbered counterflows are produced to enable locating feed-throughs and the pipe connection for the inlet and outlet of the heat transfer fluid on one side of the support plate.

This measure of optimization results in that the flow channel with fluid heated at the end of the heat transfer process is adjacent to a flow channel with cooler fluid such that already within the plane of the battery cooler possible peak temperatures can balance. In the frame of this concept, again different alternatives are possible to arrange the flow channel in one or several serpentines running through the battery cooler.

This structure, on the one hand, leads to that the fluid is over a larger area in contact to the positions where the battery elements are attached and, on the other hand, that the fluid is eddied due to the offset webs so that no resting flow islands (dead water regions) can form that can lead to local overheating.

A specific advantage of the inventive solution is that the structure plates together form a supported sandwich structure, therefore being more rigid than comparable systems of prior art, so that the plates can be designed correspondingly thinner. Therefore, the battery cooler is integratable into the battery module without the demand that the battery cooler has to additionally perform structural functions, which means that no additional reinforcements of the battery cooler are needed. Thus, the installation space required for the battery cooler and the weight of the battery cooler is minimized, which results in a relatively high efficiency of the entire battery module.

The large and very even heat transferring surface of the battery cooler removes high amounts of thermal power from the battery elements so that at the battery module a low temperature level is settable. Further, the battery elements are mountable to the battery cooler applying only relatively low pressing forces.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
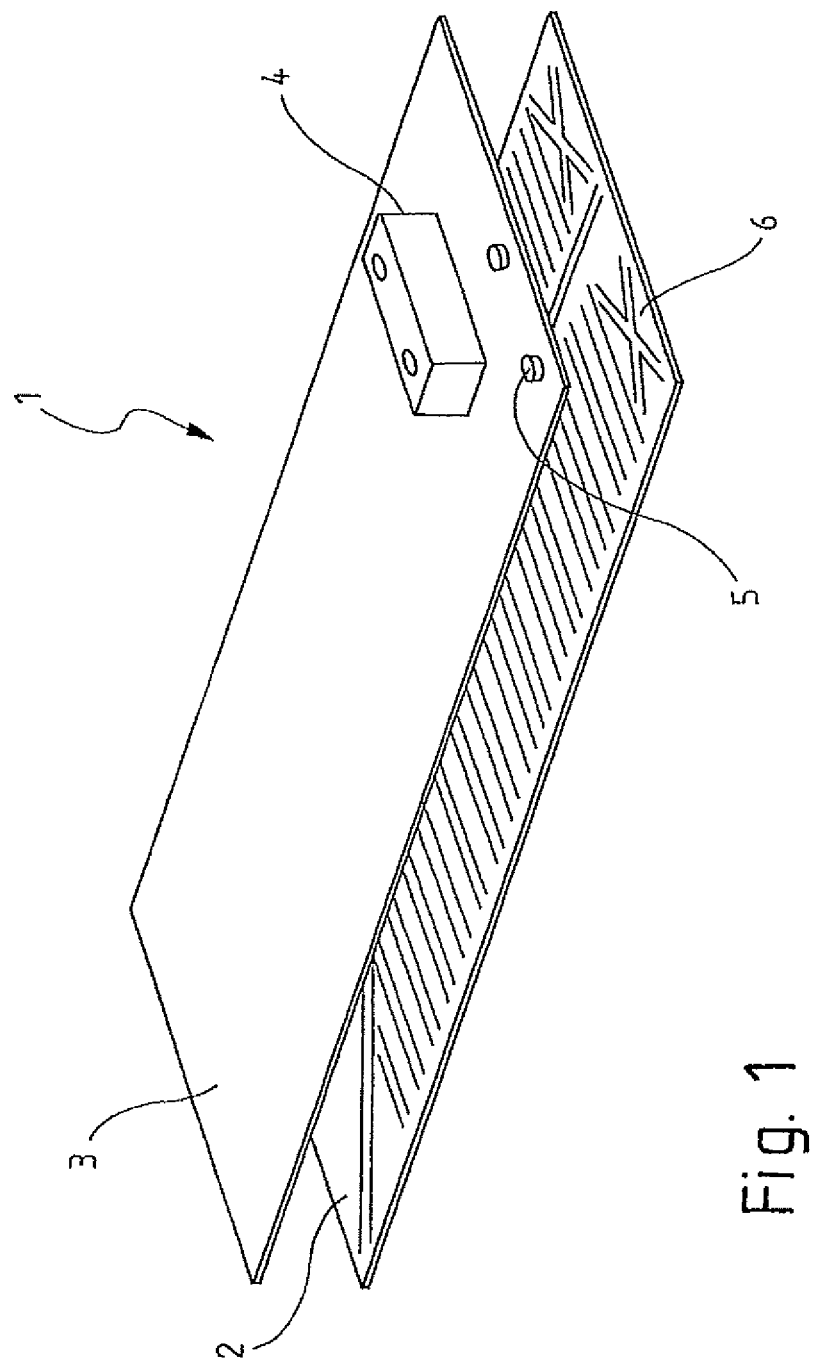
FIG. 1 is an exploded perspective view of a battery cooler according to an embodiment of the invention showing a support plate and a structure plate.

FIG. 1 shows the battery cooler 1 in an exploded view according to an embodiment of the invention. The battery cooler 1 includes a support plate 3 and a structure plate 2. It is particularly advantageous that the structure plate 2 and the support plate 3 are formed from metal materials, although other materials can be employed. A connection between the structure plate 2 and the support plate 3 is formed by brazing or adhesive bonding, for example.

The structure plate 2 is provided with a fluid connection position 6 such that at a corresponding position on the support plate 3 two feed-throughs 5 are provided. At the position of the feed-throughs 5 on the outside of the support plate 3, the pipe connection 4 is attached. The pipe connection 4 facilitates a connection of the battery cooler 1 to a fluid cooling circuit (not shown) of a motor vehicle (not shown).

A material thickness of the structure plate 2, in comparison with that of the support plate 3, can be relatively thin, as the brazed connection of webs 9 of the structure plate 2 to the support plate 3 results in an improved rigidity of the battery cooler 1. This embodiment is particularly advantageous if a refrigerant is used as fluid that evaporates at pressures in the flow channel different from the ambient pressure.

Figure 2:
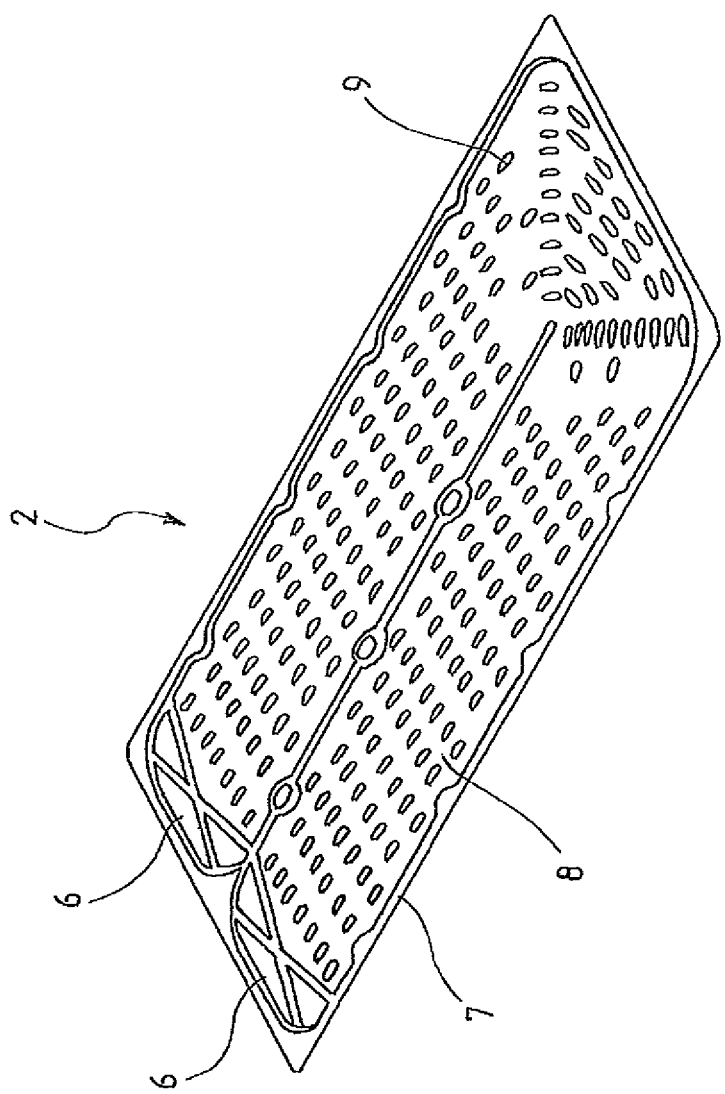
FIG. 2 is a perspective view of a structure plate having a single counterflow configuration.

FIG. 2 shows the structure plate 2 with a single counterflow configuration. In the single counterflow configuration, a fluid flow in adjacent sections of a flow channel 8 pass each other in opposite directions of flow at only one border formed by a channel boundary. The flow channel 8 has only one reversal of a direction of flow and the flow channel 8 is formed on half the width of the structure plate 2. As shown, the flow channel 8 over its width is provided with a total of six to seven webs 9.

Within the flow channel 8, the webs 9 are arranged in rows crosswise to the direction of flow with each of the rows crosswise offset in the direction of flow by half a web distance. From this arrangement two effects follow: first, a change of a velocity of flow as the webs 9 reduce a flow cross-section and second, a change of the direction of flow as the webs 9 are also disposed to form flow guiding structures. Both effects result in an advantageously turbulent flow, wherein it is ensured that no resting flow islands develop that can lead to local overheating.

Figure 3:
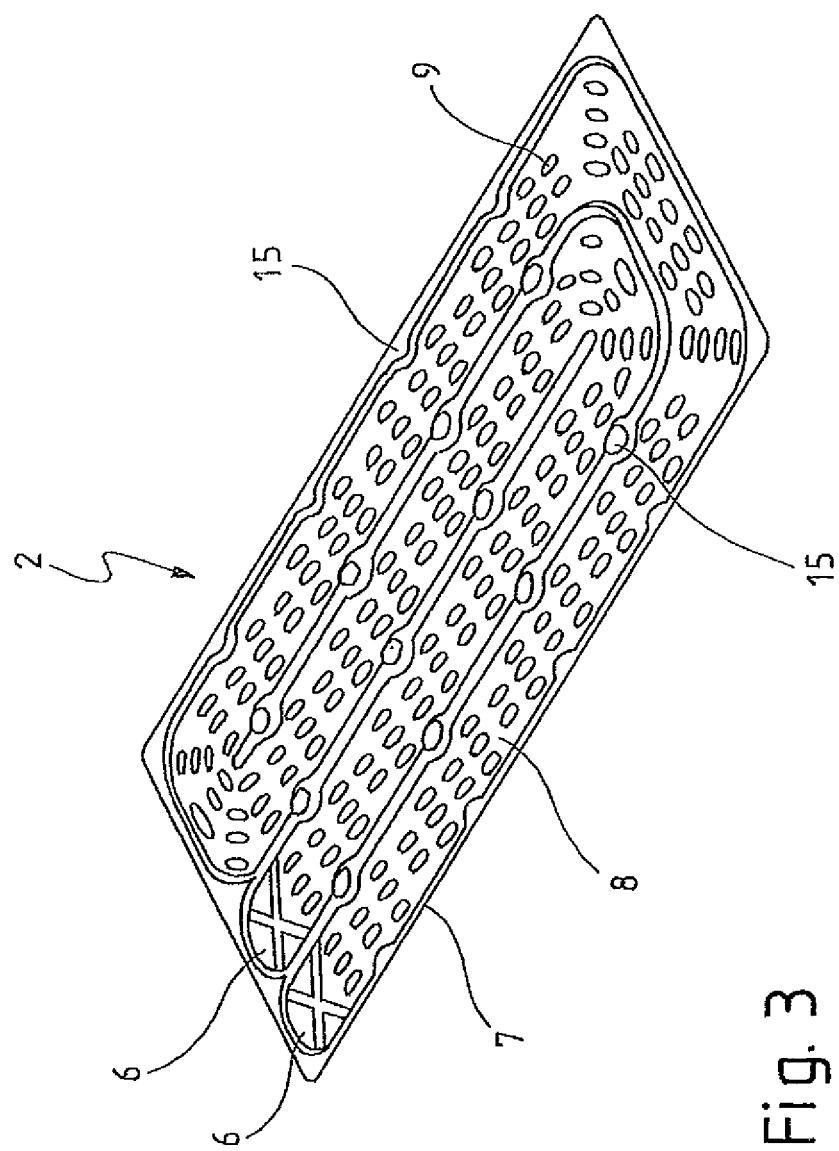
FIG. 3 is a perspective view of a structure plate having a triple counterflow configuration and lateral feed-throughs.

FIG. 3 shows the structure plate 2 with triple counterflow configuration. In the triple counterflow configuration, the flow channel 8 has three reversals of flow. Each section of the flow channel 8 formed in a quarter of the width of the structure plate 2.

It has shown useful and advantageous that a channel boundary 7 is provided with several bulges 15 at equidistant positions so that a larger connection area develops for brazing. In addition to a function of the webs 9, the bulges as broadened channel boundaries 7, by analogy to the webs 9, also fulfill the functions of narrowing the cross-section and guiding the flow.

Figure 4:
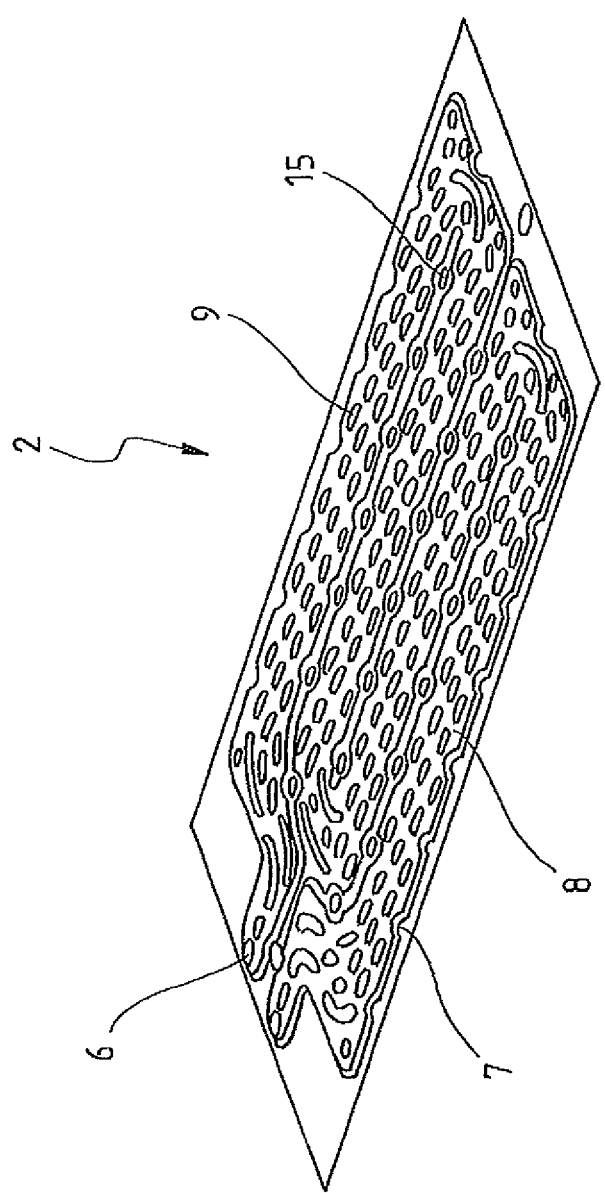
FIG. 4 is a perspective view of a structure plate having a triple counterflow configuration and central feed-throughs.

FIG. 4 shows the structure plate 2 with triple counterflow configuration and accentral fluid connection positions 6. In the triple counterflow configuration, the flow channel 8 has a total of three reversals of the direction. Each section of the flow channel 8 is formed in a quarter of the width of the structure plate 2. In this embodiment, the fluid connection positions 6 and the flow channel 8 run mirror-symmetrically in relation to a longitudinal axis of the structure plate 2.

From the foregoing description, one ordinarily skilled in the art can easily ascertain the essential characteristics of this invention and, without departing from the spirit and scope thereof, can make various change and modification to the invention to adapt it to various usages and conditions.

NOMENCLATURE 1 battery cooler
2 structure plate
3 support plate, flat plate
4 pipe connection
5 feed-throughs
6 fluid connection position
7 channel boundary
8 flow channel
9 webs

What is claimed is:

1. A battery cooler, comprising:
at least one support plate; and
at least one structure plate coupled to the at least one support plate, the at least one structure plate including a flow channel for receiving a fluid therein, the flow channel including a plurality of sections forming a multiple counter flow configuration, the plurality of sections including a first section extending adjacent a first side of the structure plate as an inlet section having a fluid-inlet connection portion for receiving the fluid into the flow channel, a second section extending adjacent a second side of the structure plate opposite the first side, and a third section positioned between the first section and the second section as an outlet section having a fluid-outlet connection portion for conveying the fluid from the flow channel, wherein the first section is directly connected only to the second section wherein the fluid flows in order through the first section, the second section, and the third section of the flow channel, the flow channel including a plurality of webs, wherein one of the webs is disposed adjacent another one of the webs in respect of a direction along a length of the structure plate, and the webs decrease the cross-section of the flow channel, wherein the sections of the flow channel are separated from each other by a plurality of channel boundaries, and a plurality of bulges are provided to the respective channel boundaries to provide connection areas for brazing, and wherein the inlet section having the fluid-inlet connection portion is adjacent the outlet section having the fluid-outlet connection portion; wherein the inlet section extends from the fluid-inlet connection portion adjacent a first lengthwise end of the structure plate to adjacent a second lengthwise end of the structure plate in a direction with respect to the length of the structure plate and the outlet section extends in parallel with the inlet section from adjacent the second lengthwise end to the fluid-outlet connection portion adjacent the first lengthwise end of the structure plate in a direction with respect to the length of the structure plate, wherein the inlet section and the outlet section share a common channel boundary among the plurality of channel boundaries, and wherein the plurality of channel boundaries contacts the fluid received in the flow channel.

2. The battery cooler according to claim 1, wherein the webs are arranged side by side crosswise to the direction of the length of the structure plate.

3. The battery cooler according to claim 1, wherein the webs are arranged in groups.

4. The battery cooler according to claim 3, wherein each group of the webs is offset in relation to an adjacent group in respect to the length of the structure plate by at least one half of a lateral distance of the webs normal to the direction of the length of the structure plate.

5. The battery cooler according to claim 1, wherein the webs on the at least one structure plate are configured such that the webs on the at least one structure plate are connectable to corresponding webs on another structure plate.

6. The battery cooler according to claim 1, wherein the at least one structure plate and the at least one support plate are coupled together by a brazed connection.

7. The battery cooler according to claim 1, wherein the at least one support plate includes a pipe connection.

8. The battery cooler according to claim 1, wherein at least one of the webs has a circular cross-section.

9. The battery cooler according to claim 1, wherein at least one of the webs has an elliptic cross-section.

10. The battery cooler according to claim 1, wherein the flow channel has a triple counter flow configuration.

11. The battery cooler according to claim 1, wherein the common channel boundary includes a first longitudinal side forming a portion of a boundary of the flow channel in the inlet section and a second longitudinal side forming a portion of a boundary of the flow channel in the outlet section.

12. The battery cooler according to claim 1, wherein all of the sections of the flow channel forming the multiple cross flow configuration are co-planar.

13. The battery cooler according to claim 1, wherein the first section is fluidly connected to the second section by a portion of the flow channel extending along the first lengthwise end of the structure plate formed opposite the second lengthwise end of the structure plate having the fluid-inlet connection portion and the fluid-outlet connection portion.

14. The battery cooler according to claim 1, wherein the flow channel includes a first substantially U-shaped portion including the first section and the second section and a second substantially U-shaped portion including the third section, wherein a substantially U-shaped channel boundary of the plurality of channel boundaries is disposed between the first substantially U-shaped portion and the second substantially U-shaped portion.

15. The battery cooler according to claim 14, wherein the second substantially U-shaped portion of the flow channel is at least partially surrounded by the first substantially U-shaped portion of the flow channel.

* * * * *